United States Patent [19]

McDonald et al.

[11] Patent Number: 4,770,128
[45] Date of Patent: Sep. 13, 1988

[54] HEAT EXCHANGER SUPPORT

[75] Inventors: Dennis K. McDonald, Massillon; Paul S. Weitzel, Canal Fulton, both of Ohio

[73] Assignee: The Babcock & Wilcox Company, New Orleans, La.

[21] Appl. No.: 177,740

[22] Filed: Apr. 5, 1988

[51] Int. Cl.[4] .............................................. F23C 11/02
[52] U.S. Cl. ................................... 122/4 D; 122/6 A; 122/235 A; 122/235 K
[58] Field of Search .............. 122/4 D, 235 R, 235 A, 122/235 C, 235 D, 235 K, 235 H, 510, 511, 6 A; 110/245, 263

[56] References Cited

U.S. PATENT DOCUMENTS

| | | | |
|---|---|---|---|
| 3,648,666 | 3/1972 | Foldes et al. | 122/4 D |
| 4,245,588 | 1/1981 | Gill et al. | 122/235 A X |
| 4,444,154 | 4/1984 | Weber | 122/4 D |
| 4,607,690 | 8/1986 | Seshemani | 122/510 X |

*Primary Examiner*—Steven E. Warner
*Attorney, Agent, or Firm*—Robert J. Edwards

[57] ABSTRACT

An in-bed tubular heat exhanger support structure comprising a plurality of fluid-cooled support tubes which extend over and are supported by the wall headers of a fluidized bed boiler. Each support tube has at least one upright portion which extends into the fluidized bed region of the boiler, and wherein at least one of the heat exchanger tubes is clamped or otherwise fixed to the upright portion of the support tube.

2 Claims, 1 Drawing Sheet

20

HEAT EXCHANGER SUPPORT

FIELD AND BACKGROUND OF THE INVENTION

The present invention relates in general to fluidized bed boilers and, in particular, to a new and useful heat exchanger support system which utilizes support tubes that extend over and are supported by the wall headers of a fluidized bed boiler.

Various systems have been developed to support heat exchangers in a fluidized bed boiler, including stringer support tubes to hang the heat exchanger and mechanical supports from which the heat exchanger is bottom supported. The use of vertical support tubes for hanging horizontally extending heat exchanger tubes are known, for example, from U.S. Pat. No. 2,893,698 to Nunninghoff, and U.S. Pat. No. 4,356,795 to Loiez et al. The use of tube columns which rise from the floor of a fluidized bed to support a heat exchanger is disclosed in U.S. Pat. No. 4,466,385 to Waryasz.

U.S. Pat. No. 4,444,154 to Weber discloses a fluidized bed boiler having horizontal heat exchanger tubes which are supported on vertical cooled support tubes extending from and supported by the floor of the boiler. Heat exchanger tubes which are supported by their headers are disclosed in U.S. Pat. No. 4,553,502 to Dreuilhe et al and U.S. Pat. No. 4,589,618 to Fournier.

Also, see U.S. Pat. No. 3,929,189 to Lecon for the use of vertical bars for supporting heat exchanger tubes and U.S. Pat. No. 4,100,889 to Chayes for horizontally extending heat exchanger tubes clamped to vertical support tubes.

SUMMARY OF THE INVENTION

The present invention utilizes fluid-cooled support tubes which extend over and are supported by intermediate headers of the fluid-cooled furnace walls of a fluidized bed boiler. It should be recognized, however, that in the case of fluidized bed boilers having furnace walls which are not fluid-cooled, the headers would be replaced by tubular support members such as pipes.

In accordance with the present invention the fluid-cooled support tubes extend into the fluidized bed region of the boiler below the freeboard region to support a heat exchanger disposed in the fluidized bed. The heat exchanger is comprised of horizontally oriented tubes that are supportingly secured to the support tubes by clamps or other known devices which will accommodate relative movement between the support and heat exchanger tubes resulting from the difference in the temperatures of the fluids passing therethrough.

The heat exchanger tubes are thus supported through the support tubes by the intermediate wall headers which are in turn supported by the furnace walls and their supports. This support system allows the positioning of the heat exchanger in the fluidized bed while removing the support tubes from the gas stream. The passing of the support tubes over the intermediate wall headers transfers the load to the furnace walls in a simple and efficient manner, and avoids extending the fluid-cooled support tubes further into the freeboard region thereby maintaining the combustion gas temperature at a high level. The use of fluid-cooled support tubes is also preferred to mechanical supports since operating conditions of the former can be more reliably predicted.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The accompanying drawings form a part of this specification and the same reference numerals designate like or corresponding parts throughout the drawings.

DESCRIPTION OF THE PREFERRED EMBODIMENT

Figure 1:
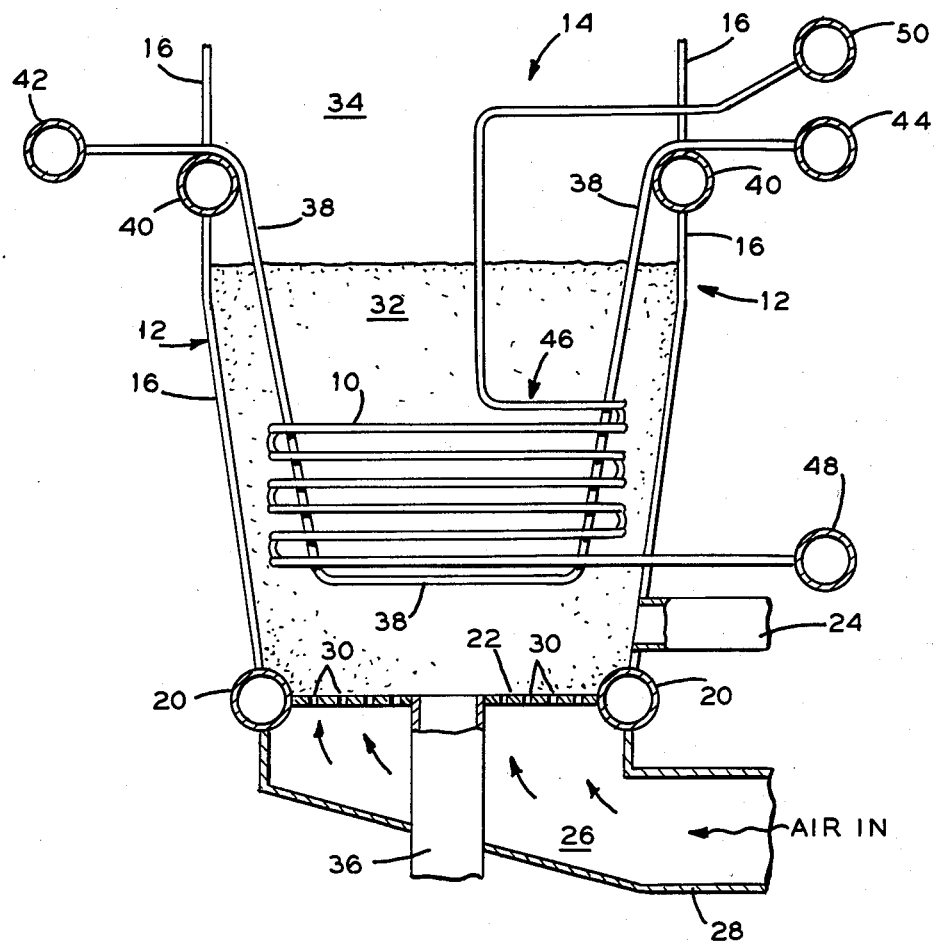
FIG. 1 is a schematic side elevation view, partly in section, of the support system of the present invention.
Figure 2:
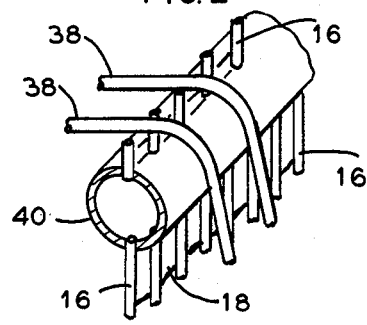
FIG. 2 is a fragmented perspective view of the fluid-cooled support tubes as they extend over and are supported by an intermediate wall header of the furnace of a fluidized bed boiler.

Referring to the drawings in particular, the invention embodied therein comprises a support system for the horizontal heat exchanger tubes 10 of a fluidized bed boiler having upright boundary walls including side walls 12 and defining a furnace 14. The side walls 12 are formed by upwardly extending parallel tubes 16 arranged to provide an upflow fluid path and having their intertube spacing closed by metallic webs 18 welded to adjacent tubes to provide a gastight construction. The lower end of tubes 16 are connected to the furnace inlet headers 20.

A bed support plate 22 extends across the bottom of the furnace 14. Particulate fuel such as coal and particulate sulfur absorbent are supplied through feed line 24 atop the bed support plate 22. Combustion air is supplied to the air plenum 26 located beneath the bed support plate 22 through inlet duct 28. The combustion air passes upwardly from the air plenum 26 through a plurality of air ports 30 in the bed support plate 22 at a rate sufficient to fluidize the particulate material atop the bed support plate 22 to establish a fluidized bed 32 superadjacent to the bed support plate 22. The particulate fuel reacts with the combustion air within the fluidized bed 32 and the freeboard region 34 thereabove to form hot gases which pass through the furnace 14 and across steam generating and heating tubes, not shown.

In order to avoid accumulation of particulate material within the fluidized bed 32 as new particulate fuel and unreacted particulate sulfur absorbent are supplied to the fluidized bed 32 through feed lines 24, it is necessary to continously or periodically withdraw a portion of the bed material, including any ash remaining from combustion of the particulate fuel and sulfated absorbent material. To this end, particulate material from the fluidized bed 32 passes by gravity through the bed drain pipe 36 for transfer through an appropriate valving system to a conveying means, such as a mechanical screw or a pneumatic system, not shown, for transport for recycle or disposal.

In accordance with the present invention, a plurality of support tubes 38 are spaced across and pass through the furnace side walls 12 and extend over and are supported by the intermediate wall headers 40. The support tubes are connected to inlet and outlet headers 42 and 44, respectively, and are generally a part of the fluid heating circuity of the fluidized bed boiler. The intermediate wall headers 40 are located near the upper surface of the fluidized bed 32, therefore only a relatively short length of each of the support tubes 38 extends into the freeboard region 34. This avoids an undesirable cooling of the gases which pass through the furnace 14.

A heat exchanger 46 is disposed in the fluidized bed 32. The heat exchanger 46 is comprised of the horizontally oriented return bend tubes 10 connected to inlet and outlet headers 48 and 50, respectively. The tubes 10 are secured to the support tubes 38 by clamps, not shown, or other known devices which will accommodate relative movement between the support and heat exchanger tubes 38 and 10, respectively, resulting from the difference in the temperatures of the fluids passing therethrough. The weight of the exchanger 46 is thus transferred by the support tubes 38 to the intermediate wall headers 40 which are supported, in turn, by the side walls 12.

While a specific embodiment of the invention has been shown and described in detail to illustrate the application of the principles of the invention, it will be understood that the invention may be embodied otherwise without departing from such principles.

The invention claimed is:

1. A support structure for in-bed heat exchanger tubes of a fluidized bed boiler having wall means defining a fluidized bed region and a freeboard region above the fluidized bed region, the wall means including tubular means disposed near a transition zone between the fluidized bed and freeboard regions, the structure comprising a plurality of support tubes having opposite ends extending respectively through the wall means and over the tubular means for support thereby, each support tube having at least one upright portion disposed in the fluidized bed region, and at least one heat exchanger tube being supportingly secured to said upright portion.

2. The support structure according to claim 1, wherein the upright portion is inclined inwardly from said wall means.

* * * * *